Dec. 26, 1944.  F. H. DALRYMPLE  2,365,866
CHAIN
Filed Oct. 7, 1942
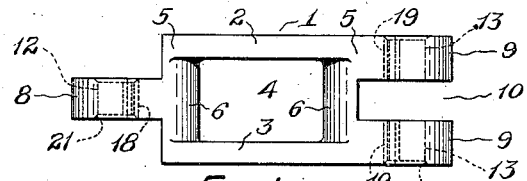
FIG. 1.
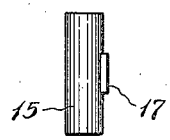
FIG. 3.
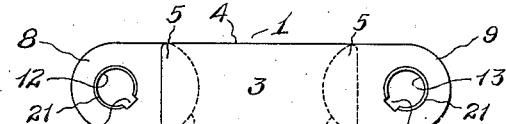
FIG. 2.
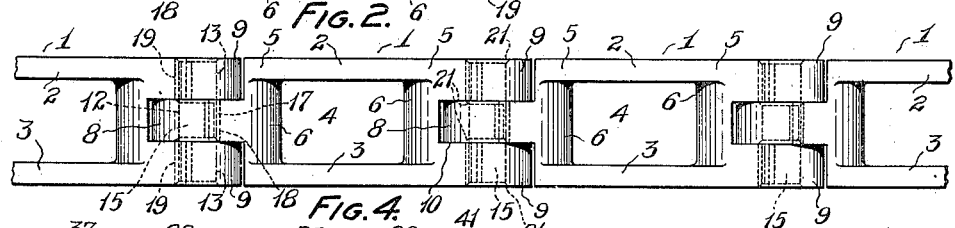
FIG. 4.
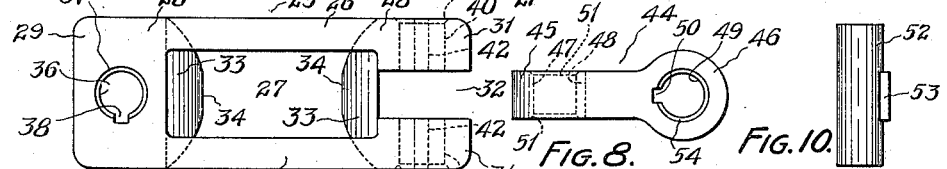
FIG. 5.   FIG. 8.   FIG. 10.
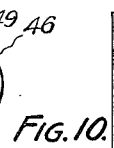
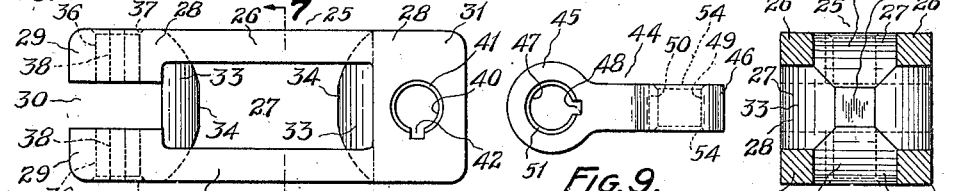
FIG. 6.   FIG. 9.   FIG. 7.
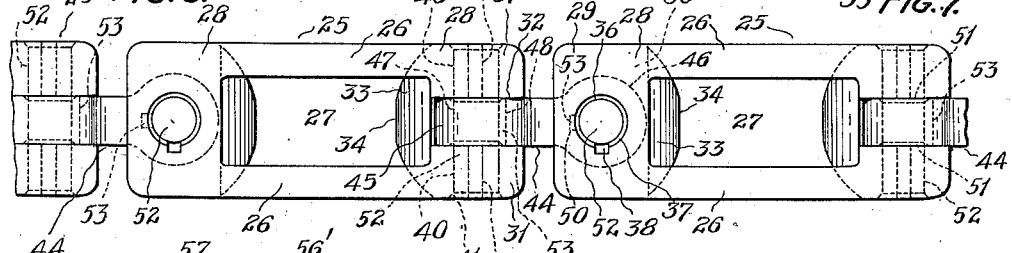
FIG. 11.
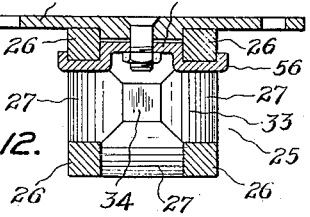
FIG. 12.
INVENTOR:
FERDINAND H. DALRYMPLE
BY
Saywell and Wessler
ATTORNEYS Patented Dec. 26, 1944

2,365,866

UNITED STATES PATENT OFFICE 2,365,866

CHAIN

Ferdinand H. Dalrymple, Bedford, Ohio

Application October 7, 1942, Serial No. 461,184

9 Claims. (Cl. 74—246)

The invention relates to improvements in chains, and particularly to improvements providing for quick and convenient detachment and replacement of every chain link. The invention also relates to improved interchangeable chain links.

One form of the invention herein shown and described provides for such link removal, replacement, and interchangeability, in chain adapted to accommodate sprocket tooth engagement in only one plane, and another form of the invention herein shown and described provides for such link removal, replacement, and interchangeability, and is also adapted to accommodate sprocket tooth engagement in more than one plane.

Other certain detail advantages inherent in the forms of detachable-link chain herein shown and described will be fully referred to in the specification hereinafter, by reference to the accompanying drawing.

The claims of the instant application are limited to the form of the invention adapted to accommodate sprocket tooth engagement in more than one plane and shown in Figures 5 to 12 of the accompanying drawing hereinafter fully described.

The annexed drawing and the following description set forth in detail certain means illustrating the improvements in chains, such disclosed means constituting, however, only two of the various forms in which the principle of the invention may be embodied.

In said annexed drawing:

Figure 1 is a plan of the link of a chain which can be formed of a plurality of like links, of which each link is readily removable and replaceable, and is interchangeable with every other link;

Figure 2 is a side elevation of the link shown in Figure 1;

Figure 3 is a plan view of a pin for articulately connecting adjacent links;

Figure 4 is a plan view of a fragmentary portion of a chain assembled from links of the character shown in Figures 1 and 2 connected in series by pins of the character shown in Figure 3;

Figure 5 is a plan view of a link having the removal and replacement advantages hereinbefore set forth regarding the form of link shown in Figures 1 and 2, but the form of link shown in Figure 5 having the added advantage of forming a chain of which each link can accommodate sprocket tooth engagement in more than one plane; this form of link shown in Figure 5 being also interchangeable with every other sprocket-engaging link;

Figure 6 is a side elevation of the form of link shown in Figure 5;

Figure 7 is a transverse section, taken in the plane indicated by the line 7—7, Figure 6;

Figure 8 is a plan view of a connecting block adapted to be secured at its respective ends to the ends of adjacent links, such as shown in Figures 5 and 6, to form a complete chain, this connecting block being interchangeable with every other connecting block;

Figure 9 is a side view of such connecting block;

Figure 10 is a plan view of a pin for articulately connecting the respective ends of the connecting block to the ends of adjacent links;

Figure 11 is a plan view of a fragmentary portion of a chain assembled from links of the character shown in Figures 5 and 6 connected in series by blocks and pins of the character shown in Figures 8 and 10, respectively; and Figure 12 is a transverse section, similar to that shown in Figure 7, but also illustrating a manner of adapting attachments to the form of chain shown in Figure 11.

Referring to the annexed drawing in which the same parts are indicated by the same respective numbers in the several views, and first referring particularly to Figures 1–4, a box-like type of link 1, Figures 1 and 2, comprises a housing rectangular in cross-section and having closed side portions 2 and 3, respectively, and an open top 4 and a similar open bottom through which sprocket tooth engagement can be effected, end portions 5 of the link having convexly curved opposed inner surface portions 6 providing sprocket tooth clearance and most effective sprocket tooth engagement.

The link 1 shown in Figures 1 and 2 is formed to provide quick and convenient removability and replacement of each link of a chain; as also, to provide secure holding together of the links and the proper relative play of the same in operation and, to this end, one link end portion 5 is formed with a central extension or tongue 8 and the other end portion 5 with opposed extensions or jaws 9 forming a central free space 10 therebetween. The extension 8 at one end of the link 1 is formed with a transverse bore 12 and the extensions 9 at the opposite end are formed with axially aligned transverse bores 13. The purpose is articulately to connect adjacent links 1 by pins 15, Figure 3, journalled in the bores 13 of one link and passing through the extension 8 of the adjacent link, which extension 8 intersects the central free space 10 of the first link with its bore 12 axially aligned with the bores 13 of the first link.

As stated, the connecting of the links 1 is designed to be a reliably secure one and to provide the desired articulation and yet provide for quick and convenient removal and replacement of the individual links. To this end, the retaining of the pin 15 in the bores 12 and 13 is effected by a cooperating key and groove. The key 17 is provided on the pin 15 and the grooves 18 and 19 are formed in the walls of the respective bores 12 and 13. It is thus apparent that if the bore 12 of one link is positioned in the space 10 in axial alignment with the bores 13 of another link with the grooves 18 and 19 in alignment, the pin 15 can be passed into the bores with the key 17 passing along the grooves 18 and 19 and thus adjacent links connected together.

The location and formation of the grooves 18 and 19 are such as to provide for the mentioned alignment for connection and disconnection of the links and also to insure that the pins 15 will not fall out or be shaken out of the bores 12 and 13 during the operation of the chain. It is evident that articulating links can be pivotally longitudinally swung toward and from each other upon the pin 15 as an axis. The relative locations of the grooves 18 and 19 is such that the key 17 of the pin 15 can be passed into the groove 18 only when two links are so positioned as to hang towards each other in longitudinal planes, i. e., the links form an angle of considerable amplitude from longitudinal alignment having its apex in the axis of the bores 12 and 13. However, when the links are in substantially longitudinal alignment, such as is true of chain operation, the key 17 of the pin 15, which is a key substantially centrally formed on the pin, is prevented from moving laterally by reason of its abutment against the inside face portions of the extensions 9. Such an arrangement of the grooves 18 and 19, whereby the key 17 of the pin 15 can be inserted in the bore 12 only when the two links have been swung toward each other and which will prevent the lateral movement of the key 17 when the links have been straightened out is shown in Figure 2, and the particular relative location of the grooves 18 and 19 therein shown is an offset arrangement of each groove of substantially 45° in opposite directions from parallel vertical planes so that the complete differential between the grooves 18 and 19 or the amount of their dissymmetrical location relative to the axis of rotation of the links, when rotated on the bores 12 and 13 as an axis, is substantially 90°.

Each link 1 of the chain shown in Figure 4 is identical with every other link and hence they are all interchangeable. Furthermore, they can be turned end for end for connection with another like link properly positioned, and can be reversed top and bottom, thus to provide desired wear or compensate for unequal wear.

In addition to the ready and convenient removability and replacement of the individual links just described, an added advantage provided is the making of the pin 15 of such a length that it is flush with the outer surfaces or even shorter than the overall dimension of the extensions 9 of the link whereby all side surfaces of the link are smooth surfaces for bearing against channel guides in which the type of chain shown usually runs. The pin shown in the accompanying drawing is somewhat shorter than the transverse dimension of the link 1. The outer ends of the bores 13 in the extensions 9 and both ends of the bores 12 in the extension 8 have outwardly flared beveled surfaces, as indicated by "21," to provide for convenient insertion of the pin 15 in the bores 12 and 13.

It is evident, however, that in an emergency, such as might occur in the field, and if the pin 15 herein shown and described is not available, a standard pin such as the headed or cotter type could be utilized.

The fit of the key 17 in the grooves 18 and 19 is mediumly tight and it is designed that the pin 15 when inserted or withdrawn therefrom shall be lightly tapped on the end to effect the moving of the key 17 lengthwise of the grooves 18 and 19.

Referring to the form of invention shown in Figures 5–11, the links of the chain are each adapted for sprocket engagement in more than one plane. This form of link also possesses the advantages of removability, replacement, and interchangeability above described with reference to the form of link and chain shown in Figures 1–4.

The form of chain shown in Figures 5–11 comprises a multiple of spaced cage-links alternated with blocks forming connecting links. One end of the block is articulately connected to one end of a link and the opposite end of the block is articulately connected to the opposite end of a similar link, the connecting means being journal pins having outwardly-extended keys seated in grooves formed in the connecting block.

Referring in detail to the form of chain shown in Figures 5–11, the link 25 has spaced edge bars 26 providing openings 27 for sprocket tooth engagement on all four sides of the link 25. One end 28 of the link 25 is formed with outwardly-extended spaced jaws 29 forming a free space 30 therebetween and the opposite end 28 of the link 25 is formed with similar outwardly-extended jaws 31 arranged, however, at right angles to the jaws 29, to form a free space 32 at right angles to the aforementioned free space 30. All of the inner face portion of each link end 28 except a central plane portion 34 is comprised of a plurality of convexly curved surface portions 33 extending from the peripheries of the respective sides of the link end 28 to an edge of the central plane portion 34, thus providing ample sprocket clearance and effective sprocket tooth engagement on all four sides of the link 25.

The jaws 29 are formed with axially aligned bores 36 having outer beveled ends 37, the walls of these bores 36 being intersected by aligned grooves 38. The jaws 31 are formed with axially aligned bores 40 having outer beveled ends 41, the walls of these bores 40 being intersected by aligned grooves 42. It is evident that the axes of the bores 36 and 40 extend relatively in right angular directions. The grooves 38 and 42 are formed in the same positions relative to the axes of the respective bores 36 and 40, i. e., by reference to Figures 5 and 6, it will be noted that the grooves 38 and 42 are located centrally of the bottom of the respective bores 36 and 40 when the link 25 is turned so that the bore extends horizontally.

The connecting blocks 44 which alternate with the cage links 25 have enlarged rounded portions at each end, one portion 45 extending in a direction at right angles to the opposite end portion 46. The block end portion 45 is formed with a transverse bore 47 having outer beveled ends 51 and whose wall is intersected by a groove 48, and the block end portion 46 is formed with a bore 49 having outer beveled ends 54 and whose wall is intersected by a transverse groove 50. As clearly appears in Figures 8 and 9, the grooves 48 and 50 are each located on that side of their respective bores 47 and 49, respectively, which is toward the center of the connecting block 44.

The articulate connection of the alternate links 25 and connecting blocks 44 is effected by pivotally securing the end 45 of the block 44 in the free space 32 at one end of the link 25 and also pivotally securing the other end 46 of the block 44 in the free space 30 of a similar link 25. This connection is effected by means of journal pins 52 having central outwardly-extended keys 53 adapted to cooperate with the grooves 38, 42, 48, and 50. By reason of the relative disposition of the various bores and grooves, the key 53 can be passed completely into the grooves 42 and 48, if the block 44 is moved 90° relatively to the link 25 or the link 25 moved 90° in the opposite direction relatively to the block 44, or both the link 25 and the block 44 moved relatively an aggregate of 90°. A longitudinal straightening of the link 25 and the block 44, for chain operation, will relatively move the link 25 and the block 44 so that the key 53 cannot pass through the grooves 42, but will be locked in by the inner side faces of the jaws 31.

Also, a movement of the block 44 90° relatively to the jaws 29 of the link 25, after the end 46 of the block 44 has been passed into the free space 30, will bring the grooves 38 and 50 into alignment so that a pin 52 can be passed into the bores 36 and 49 with the key 53 passing into the groove 50, after which a straightening of the link 25 and the block 44 will lock the key 53 against the inner side faces of the jaws 29.

As before stated, the form of link 25 shown in Figures 5 and 6 is adapted for sprocket engagement in more than one plane. This link 25 can be engaged by sprocket teeth on all of its four sides. Therefore, a chain formed from links of this character can be driven concurrently both by vertical driving and horizontal driving. Each link can be turned, as desired, to present any of its four faces to either side or top or bottom for accommodation of driving or wearing conditions.

Referring particularly to Figure 12, it will be noted that one way of securing an attachment to the improved chain is therein shown, a double channel base 56 being positioned against and adjacently below the two upper link corner bars 26 to which double channel base 56 is bolted the attachment platform 57. The snug connection of the channel base 56 with the bottom surfaces of the top corner bars 26 and a raised central base portion 56' to which the attachment platform 57 is bolted provide a securing structure for the attachment which does not interfere with sprocket tooth engagement through the side openings 27 of the link.

What I claim is:

1. A chain link having a skeleton body portion with four open sides for sprocket engagement in a plurality of planes, the link having end portions formed with centrally disposed plane inner face surfaces and curved surfaces extended from the plane surfaces to the peripheries of the respective sides of the end portions, the end portions being formed with connecting-pin bores whose respective axes extend in relatively right angular directions, the walls of the bores being intersected by grooves for pin keys.

2. A chain link having a skeleton body portion with four open sides for sprocket engagement in a plurality of planes, the link having end portions formed with centrally disposed plane inner face surfaces and curved surfaces extended from the plane surfaces to the peripheries of the respective sides of the end portions, the end portions being formed with connecting-pin bores, the walls of the bores being intersected by grooves for pin keys.

3. A chain having a multiplicity of links, each adjacent two of which are connected by a block articulately connected thereto by journal pins, each link and each block having bores at each end adapted to accommodate a journal pin, the bores of the links being extended in relatively right angular directions and the bores of the block being extended in the same relatively right angular directions, the walls of all of said bores being formed with grooves, a key outwardly extended from each journal pin and adapted to be accommodated in the grooves, the respective grooves of the links and the block which are extended in the same directions being located relatively ninety degrees apart relative to the axis of rotation when the link or block is rotated on a pin as an axis.

4. A chain having a multiplicity of links, each adjacent two of which are connected by a block articulately connected thereto by journal pins, each link and each block having bores at each end adapted to accommodate a journal pin, the bores at each end of the links being formed in opposed spaced side extensions thereof and the respective ends of the block being accommodated in the spaces between the side extensions, the bores of the links being extended in relatively right angular directions and the bores of the block being extended in the same relatively right angular directions, the walls of all of said bores being formed with grooves, a key outwardly extended from each journal pin and adapted to be accommodated in the grooves, said key being located intermediate the ends of the journal pin and being accommodated in the space between side extensions of the link, the respective grooves of the link extensions and the block which are extended in the same directions being located relatively ninety degrees apart relative to the axis of rotation when the link or block is rotated on a pin as an axis.

5. A chain link having a body formed with engaging surfaces providing sprocket engagement in a plurality of non-parallel planes, the end portions of the body being formed with journal bores for articulate connection of the link with adjacent chain elements, the axis of the bore at one end of the link being non-parallel to the axis of the bore at the opposite end of the link, the walls of the bores being intersected by key grooves.

6. A chain link having a body formed with engaging surfaces providing sprocket engagement in a plurality of non-parallel planes, the body being further formed at each end with spaced connecting portions having respective axially aligned bores, the axis of the bores at one end being non-parallel to the axis of the bores at the opposite end, the walls of the bores being intersected by key grooves.

7. A chain link having a body formed with engaging surfaces providing sprocket engagement in a plurality of non-parallel planes, the body being further formed at each end with spaced connecting portions having respective axially aligned bores, the axis of the bores at one end being extended at right angles to the axis of the bores at the opposite end, the walls of the bores being intersected by key grooves.

8. A chain link including a skeleton body member with end portions having convex inner end surfaces and lengthwise edge bars connected to said end portions thus forming link openings for sprocket engagement on relatively right angular sides of the link and between adjacent edge bars, the body being further formed for articulate connection of the link with adjacent chain elements.

9. A chain link including a skeleton body member with end portions having convex inner end surfaces and lengthwise transversely-spaced bars connected to said end portions to form link openings for sprocket engagement on non-parallel sides of the link and between adjacent bars, the body being further formed for articulate connection with adjacent chain elements.

FERDINAND H. DALRYMPLE.